United States Patent [19]

Gardella et al.

[11] 3,768,392
[45] Oct. 30, 1973

[54] FILM MAGAZINE DISPENSING UNIT AND CONTROL SYSTEM

[75] Inventors: Anthony Gardella, Westfield; David Kolton, East Hanover, both of N.J.

[73] Assignee: Addressograph-Multigraph Corporation, Cleveland, Ohio

[22] Filed: Dec. 1, 1972

[21] Appl. No.: 311,086

[52] U.S. Cl.............. 95/89 R, 95/31 CA, 206/52 F, 206/DIG. 36, 242/71.1, 242/197, 352/72, 352/78 R
[51] Int. Cl. .............................................. G03d 3/00
[58] Field of Search .............. 95/89 R, 90.5, 31 FS, 95/31 PF, 31 CA; 206/52 R, 52 F, DIG. 36; 242/71.2, 71.1, 197; 352/72, 78 R, 78 C

[56] References Cited
UNITED STATES PATENTS
2,694,533   11/1954   Zucker........................ 206/522 R X
3,490,348   1/1970   Ariyasu et al................. 352/78 C X
1,751,593   3/1930   Merle............................ 352/78 R X
3,699,869   10/1972   Jensen............................ 95/89 R X
3,675,992   7/1972   Winkler et al. ............... 352/78 C X Primary Examiner—Fred L. Braun
Attorney—Russell L. Root

[57] ABSTRACT

A strip supply magazine, known also as a cassette, having two or more exit openings, in order to provide visual indication of the type of material within the cassette. The preferred embodiment also provides an exposing and/or developing system, including interacting devices on the cassette and the holder for the cassette to control the rate of processing. The rate differs according to the position of the cassette in a holder by causing the interaction or not.

2 Claims, 8 Drawing Figures

PATENTED OCT 30 1973 3,768,392
SHEET 1 OF 2
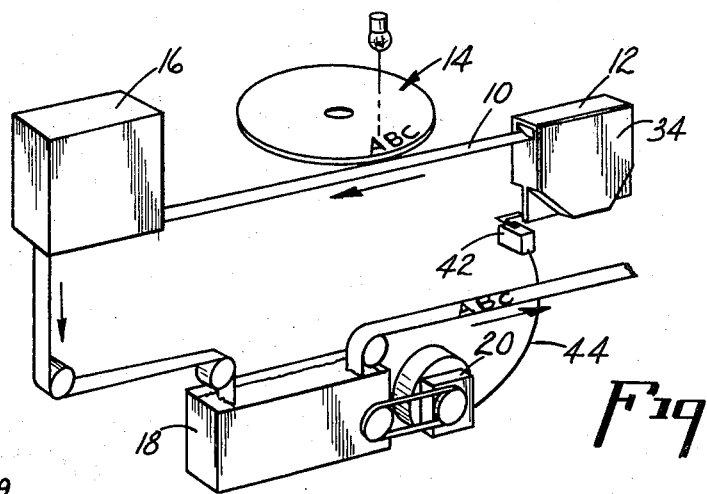
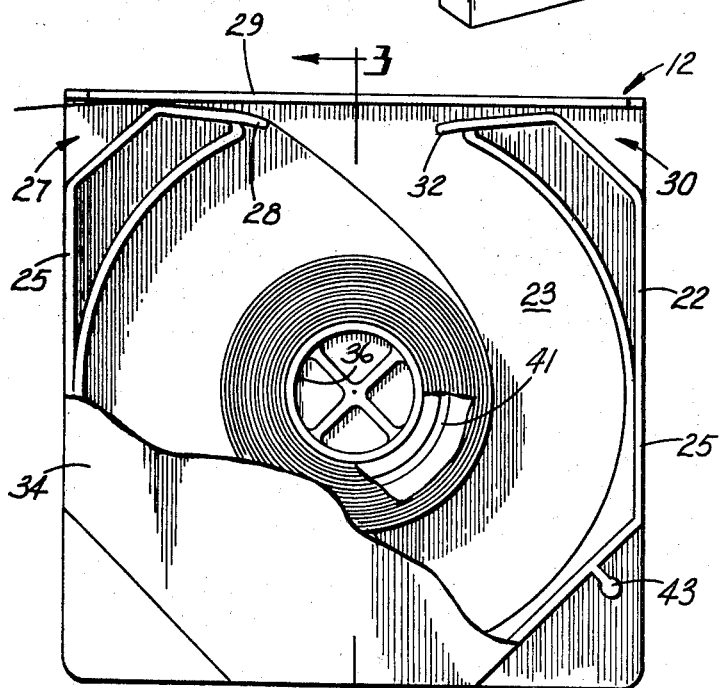
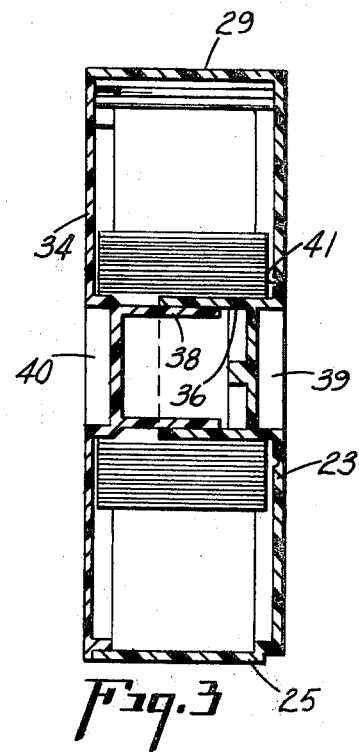
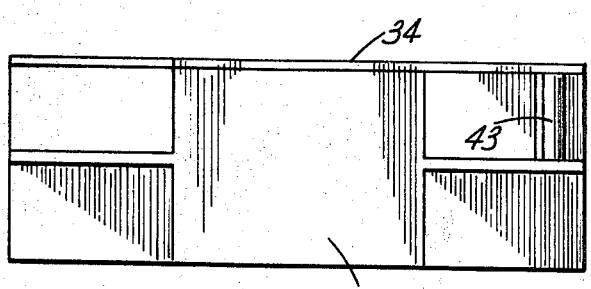
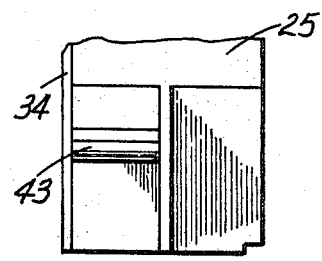

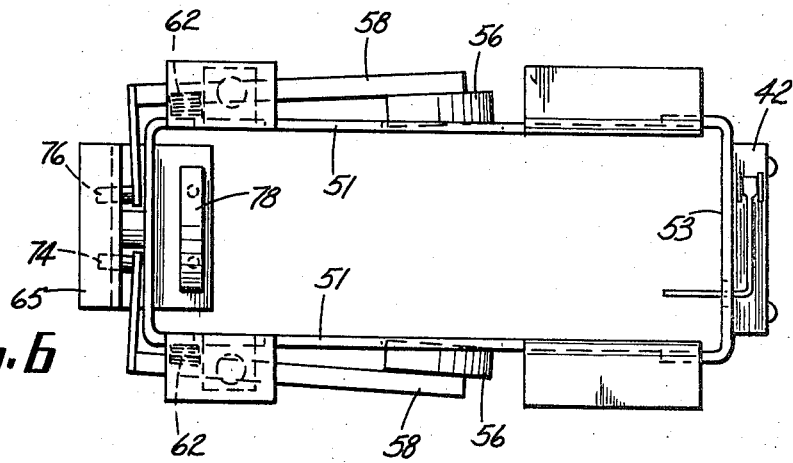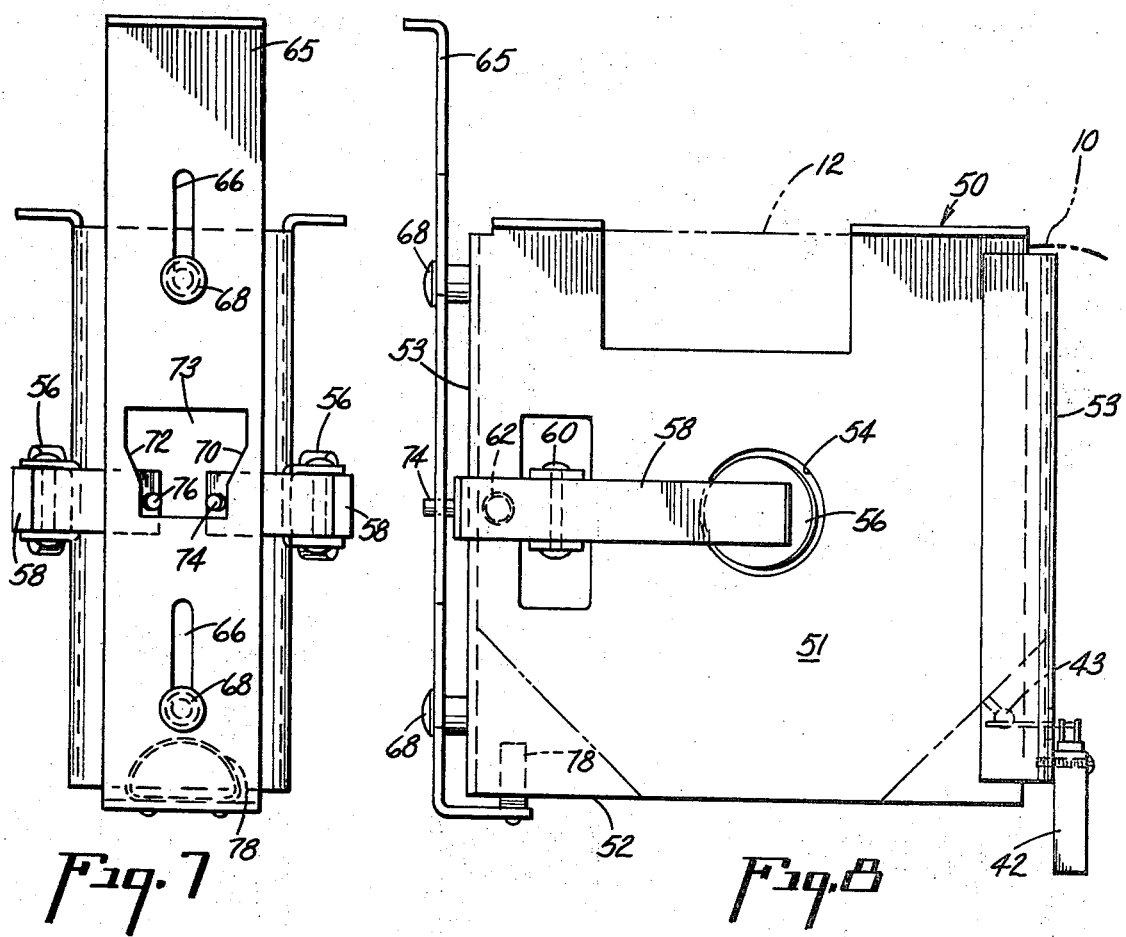

FILM MAGAZINE DISPENSING UNIT AND CONTROL SYSTEM

BACKGROUND OF THE INVENTION

Composition of newspaper copy requires headlines and special size and/or shape of print to caption a body of text. Advertising is much more dependent upon a wide variety of sizes and shapes than headlines. Hence a special printing machine finds wide acceptance in advertising production.

The printing industry uses webs of photographic print paper exposed by master masks to produce a substantial portion of such larger special lettering or symbols.

One of the better printers for such purpose uses a light tight supply magazine to provide coils of the sensitive paper. A leader web of the coil is threaded from the magazine into a feed mechanism and through an exposure station. In the exposure station a disc which carries a font of print, much like a circular photographic film, is used to provide the exposure source. There are other means of producing such source, such as filmstrip and cards. It is not essential to understanding, but reference may be had to United States Wirtz Patent No. 2,742,830 for an explanation of the construction and use of such device in detail.

The film web is then developed and pasted into a format with other text and illustrations to form a completed composition for presentation to a process camera where a master negative for printing is produced.

Such printers are sold by various manufacturers, one being the device sold under the trademark "Headliner" by VariTyper Division of Addressograph-Multigraph Corporation in the United States of America. The "HEADLINER" printer is provided in one simple form wherein the photosensitive web is supplied by one magazine and taken up by a receiving magazine after exposure. The receiving magazine is then transported to a developing unit which serves one or many such exposure units and the web is taken from the receiver magazine and processed to produce finished useful copy.

Another version, which is more expensive but much more convenient, leads the exposed photographic web into a receiving hopper and after the end of the exposure process, the web is severed from the body of the supply magazine and then run through a self-contained processing unit. A temporary storage is necessary because the exposure takes place at a rate at which the operator is able to conceive and execute the steps necessary for composition, whereas the development takes place at a uniform rate. Usually the processing can go much faster than the composition. Although not necessary to an understanding of such a device, reference may be had to Wirtz U.S. Pat. No. 2,742,831 for a specific illustration and discussion of such a structure.

SUMMARY OF THE INVENTION

Historically the web of photographic material used to produce the large print has been photographic print paper in continuous rolls of web. The development speed of the print paper is relatively slow and therefore the processing which is preferably done mechanically, has been at a fixed rate suitable to that one material. Such a development device which takes the paper web to developing rinsing and fixing may be studied in more detail by reference to U.S. Pat. No. 3,401,618, although any suitable photographic development equipment will suffice.

Newer and much faster development paper is now available. This is known as stabilization paper. Although the exposure rate is still tied to the operator mental process and physical ability, the processing rate is considerably faster.

With prior known equipment, using the conventional photographic paper, such stabilization paper would not be acceptable because it would be improperly developed. The logical solution is to provide a drive for the developing processor having two speeds, one of which is designed to develop the slow paper and one of which is designed to develop the fast paper. However, the human element is such that to remember to process at the correct speed is not an absolute certainty. Humans are very prone to oversight and at times will fail to take care to set all controls properly when the controls are set by human choice.

Accordingly, this invention has as one of its objects the provision of means to sense which type of paper is placed in the machine and to establish the development rate accordingly without human intervention.

Human operators also neglect the use of obvious warning signs. Accordingly, the supply magazine for such printing apparatus of necessity must be interchangeable, and hence if warning labels are ignored, a careless operator may very well select the wrong paper, or establish processing controls for paper other than that selected.

Accordingly, it is a further object of this invention to provide a supply magazine which is loaded by the manufacturer in a way which will require the apparatus to respond to the loading of the magazine and thereby establish correct processing speeds without human intervention.

IN THE DRAWINGS

FIG. 1 is a schematic illustration of the major elements of a fully integrated exposure and development machine for printing strips of indicia;

FIG. 2 is a side elevation, with a portion of a cover broken away, of a new and improved sensitive web magazine made according to this invention;

FIG. 3 is a section taken substantially along the line 3—3 of FIG. 2;

FIG. 4 is a bottom view of the magazine of FIG. 2;

FIG. 5 is a fragmentary side elevation;

FIG. 6 is a top view of a magazine receiving socket;

FIG. 7 is an end elevation of the socket; and

FIG. 8 is a side elevation of the magazine receiving socket.

DESCRIPTION OF THE PREFERRED EMBODIMENT

In the illustration schematic FIG. 1, a photosensitive web 10 is seen emerging from a storage magazine 12. The web 10 in most instances will consist of a paper web coated with a photosensitive surface. It is a photographic print paper. Nevertheless, this web 10 may be any exposable material capable of being imaged in an exposure station 14, such as the printing machine referred to in the Wirtz U.S. Pat. No. 2,742,831.

The storage magazine 12 is a convenient means for handling such material which is sensitive to light. Such magazines are also referred to as cassettes to signify the physical nature of the device in that it is adapted to be dropped into a receiving socket and thereby supply a device without concern about light exposure.

In the usual commercial device, the web 10 traverses the exposure station 14 and is then placed in temporary storage in the storage device 16. Again, a type of storage device is shown in Wirtz U.S. Pat. No. 2,742,831 as previously described.

After a length of the web 10 has been properly exposed, the operator severs the web from the supply in the cassette magazine 12 by means of an internal knife, and then the web is picked up by a feed mechanism and delivered to and through a developer tank 18. Such developer tank is shown in U.S. Pat. No. 3,401,618. If the web is delivered to a storage cassette rather than to the temporary storage 16, and separately developed in developing apparatus specifically designed for development only, the receiving socket and cassette may be constructed in accordance with the principles of this invention.

A variable speed drive 20 is provided to deliver the necessary output speed. The web delivered from the developing tank 18 is then ready to be dried and mounted in the presence of other text material for camera ready copy in the printing art.

The new and improved magazine cassette of this invention is indicated generally by the reference character 12, and is shown in detail in FIGS. 2 through 5. In the FIG. 2 the base is shown as consisting of a large flat side wall 23 having narrow edge walls 25 substantially equal to the normal width of the web 10 to be encased with in the magazine 12.

This new magazine has two exit openings in order that the manufacturer may orient a coil of the web within the magazine to exit one or the other of the openings and thus provide a clear indication of what type of material is contained within the magazine. That indication is one phase of the novelty of this invention.

In order to provide the two openings, a first exit opening 27 is shown as an inwardly curved guide wall 28 underlying a cap wall 29 to define a narrow slot opening. Note that even with the paper in place the slot opening in the exit 27 is not necessarily absolutely light proof. The cassette is normally not intended to hold the extremely light sensitive type of photographic material such as projection or camera speed photographic material. Nevertheless, light traps, such as felt strips may be installed in the exit opening if such light tightness is desired.

A second exit 30, unused in FIG. 2, is provided so that another type and another speed of photosensitive web 10 may be placed in the magazine, and coiled in the opposite hand as that illustrated in FIG. 2 in order that a lead edge of the web may fall into a natural curve to exit the opening 30.

In use, the cassette magazine 12 is normally dropped into a holding socket and enclosed within the machine. A lead web of the coil is normally drawn from the cassette to feed into the exposure station, and at the beginning of each subsequent exposure a leader web is normally withdrawn. Therefore, any stray light which may enter into the unused exit opening 30 in the FIG. 2 illustration will be of no consequence because that portion which may possibly have some exposure is lead off and used as the discard.

Again, in the exit 30, side wall 25 is shown curved into a curve guide wall 32 internally of the base 22 underlying the cap wall 29.

The curvature of the walls 28 and 32 are such that the hand of spiral will naturally fall along the guide wall and out of the appropriate exit. Note that if the coil is attempted to be fed through the improper exit, for example in FIG. 2 if the web were attempted to be fed through the exit 30, an unnatural doubling back of the web would take place which would cause binding and immediately signify to the user that there is an improper loading of the cassette magazine.

A cover 34 is substantially a flat wall having appropriate interfitting surfaces to close off the base 22 and enclose the photosensitive web 10 therein.

The base 22 has a spool shaft 36 preferably formed integrally with a wall 23 as illustrated best in FIG. 3.

A lock shaft 38, which is tubular in form in the illustrated embodiment is formed with a taper to fit an internal taper wall of the spool 36. As is well known, slightly tapered walls of such nature, when made of compatible material will tend to lock in place when forced together with slight pressure and resist separation with extreme tenacity. It is the purpose of the construction illustrated to lock in such manner in order to hold the cover 34 tightly upon the base 22 and prevent unintentional or accidental exposure of the contents of the cassette magazine. Furthermore, such internal locking will prevent fraud by spurrious reloading of empty magazines with wrong or inferior material by unauthorized persons. To this extent, a groove 41 is molded circumferentially from the spool 36 where it joins the wall 23 in order to provide a point of weakness which is designed to resist breaking to a lesser degree than the holding power of the interfit between the interlocking surfaces of the spool 36 and the lock shaft 38. Accordingly the magazine is intended to be destroyed by removal of the cover 34 once properly installed.

In order to mount the magazine in a holding socket, holding recesses 39 and 40 are molded into the base and cover respectively as shown best in FIG. 3. A mounting pad from supporting equipment may be inserted into such recesses for maintenance of the magazine in proper operating relationship.

Referring again to the FIG. 1, and to the FIGS. 6 through 8, the preferred holding socket to support and maintain the magazine 12 together with the magazine controlled speed drive 20 is set forth.

It is one object of this invention to provide the magazine 12 with the configuration that will cooperate with the switch 42 such that in one loaded position the cassette magazine will contact the switch 42 and set up a first signal condition, and in the opposite hand position will not affect the switch and therefore permit a second signal condition.

Refer to FIG. 2. A tab 43 is shown molded on one tapered bottom wall of the magazine 12. The magazine is substantially symetrical in elevational silhouette except for the presence of tab 43 in this one location. Assuming the relationship of switch 42 and magazine 12 shown in FIG. 1, assuming further that the web 10 is located in the magazine as shown in FIG. 2, and finally assuming that the magazine is located with the cover 34 facing the operator as shown in FIG. 1, then the tab 43 will be located at a remote location from switch 42 and will have no effect upon the switch. According to the manner in which the switch and the variable speed drive are wired, this will set up a first condition of speed.

However, if another speed web is placed in the cassette and wound with the opposite hand to exit through the exit 30, then in order to supply film the cassette would of necessity be reversed to place the wall 23 facing the operator and in so doing would cause the tab 43 to contact switch 42 and establish a different electrical condition in the variable speed drive 20 to process that web supply at a different rate of speed.

Hence, not only does the exit through which the web exit signify to the operator the type of material in the magazine, but the magazine per se in conjunction with a cooperating switch 42 operating as a control over the variable speed drive 20, will take from the operator the responsibility of selecting the processing speed.

In order to support the magazine 12 properly, an improved novel socket 50 has been devised. Socket 50 is shown in three elevations in the second sheet of drawings, and essentially is composed of side walls 51 and end walls 53. The actual commercial form of the socket is shown in the figures and comprises a U-shaped metal formation with a cap over one end capturing the two ends to complete the box-like socket formation. The switch 42 is physically attached to the bottom of the end cap and has the conventional switch actuator extending within the socket to contact and be contacted by the tab 43.

It is true, of course, that the magazine 12 can be formed with a recess in order to provide clearance for such a switch, rather than a tab 43 to project out and contact the switch. They are mutually cooperating in either event, and simple reversal of electrical control through a supply wire 44 will suffice to set up the proper conditions as well understood by those skilled in electrical wiring techniques.

The two side walls are ported by ports 54 and pads 56 operate through the ports to engage into the recesses 39 and 40 described with respect to the cassette magazine 12. Thus, if the magazine 12 is dropped into the socket as suggested by the phantom outline showing in FIG. 8 the sockets 39 and 40 will be positioned at the port 54 and the pad 56 may be pressed through the port to engage into the sockets 39 and 40 and thus support the cassette within the socket.

Again to take away the necessity for operator attention, the socket is provided with self-acting clamping mechanism. The pads 56 are carried on the end of levers 58 which levers are fulcrumed at pivots 60. Springs 62 operating between the lever and the side wall of the socket urge the pad into the port 54 as a normal condition.

Each of the levers 58 carries on the end thereof cam followers 74 and 76 which may be activated to overcome the force of the spring 62 and withdraw the pads from the port to release a magazine contained therein.

The end view FIG. 7 explains the mechanism for self-actuating in order to capture the magazine within the socket.

A vertical column 65 is mounted on the end wall of the socket by means of guide pins 68 operating in vertically longitudinal slots 66 of column 65. An opening 73 in column 65 provides a right and a left hand cam surface 70 and 72 to operate the cam followers 74 and 76. As the illustration suggests, when the column 65 is elevated as shown in FIG. 7, the cam followers 74 and 76 are forced toward one another to withdraw the pads 56 from the ports 54. Lowering of the column 65 will allow the cam surfaces 70 and 72 to release the cam followers and permit the spring 62 to cause reengagement of the pad 56 into the port 54.

A cushion spring 78 carried on the bottom end of column 65 is located within the cassette in a position to be contacted by the magazine as the magazine is lowered into the interior of the socket. Because the spring 78 is a cushion, it will permit a degree of movement of the column 65 with respect to the magazine 12. Hence, as the magazine 12 is dropped into the socket it will contact the spring 78 and force the column 65 downwardly thus releasing the pad 56 to grab and maintain the magazine 12.

When the magazine is to be released, the operator will lift upwardly on the top of the column 65, causing the cushion spring to distort because the pads 56 have not yet released the magazine and the magazine resists displacement. However, slight movement of the column 65 upwardly will cause the sloping portion of the cam surfaces 70 and 72 to allow release of the cam followers 74 and 76 and the pads 56 will then release the cassette for removal. The cushion spring action of spring 78 actually helps to lift the cassette upwardly at that time for easy removal.

Note also, that the actual web exposure time hase not been critical in past devices because the font source is total opaque or clear and the paper in popular use has been of a type to be fully black or white, with no gray tone. It is feasible, with the present invention, to provide exposure speed control as well as development speed control, in order to use alternative film web.

There is an optimum exposure for paper backed web as well as the transparent film. The drawings and description herein have been limited to teaching of development control with the knowledge that exposure control will be readily understood by analogy.

What is claimed is:

1. A cassette for the supply of film to a multiple speed printer, which printer has a cassette socket substantially rectangular in opening formation for receiving the cassette in a selected one of two possible positions, and a speed control switch projecting into the socket;
    said cassette having a shell section with a side wall and enclosing edge walls enclosing a single film coil area, two exit openings spaced from the one area with guide wall surfaces leading thereto, said guide wall surfaces being curved in opposite spiral hands so as to accept a leader web only from a coil in said cassette area positioned to loop in a regular natural curve from the coil to the opening, whereby the exit openings may be served by oppositely spiraled coils of film;
    a cover to enclose said shell section; and
    a switch projection on one portion only of the cassette located to contact the socket switch in only one of the two possible positions, the shell and side walls configured to avoid the switch in the other position.

2. In a film exposure and development machine having a developer tank, conveyor means including a power drive device for moving a web of photoresponsive material through the tank, said power drive device having at least two separate operative speeds, an exposure printer with conveyor means for moving a web of film through said exposure printer, an intermediate storage collector for receiving a web of film after exposure and directing the web to said developer tank at completion of exposure, the improvement of a film supply and development speed control, comprising:
    a film cassette;

a cassette receiving socket for supporting said cassette on said machine;

said cassette having a central cavity for housing a coil of film web, and first and second web exit openings to provide egress for the film web;

said cassette providing a first film coil position with the coil spiraling clockwise with a leader web looping off to said first exit opening, and a second film coil position with the coil spiraling counterclockwise with a leader web looping off to said second opening;

said receiving socket having retaining means to hold said cassette positioned in a selectd one of two possible positions to direct a film web emerging therefrom through one of said first and second web openings to said conveyor means of the exposure printer;

a speed controller including a switch for establishing one of two speed conditions for said power device drive; and means carried by said cassette for influencing said switch to set up one of said conditions when the cassette is placed in said socket with the first exit opening positioned to direct the web to said exposure printer, and to set up the other condition when the cassette is placed in said socket with the second exit opening positioned to direct the web to said exposure printer.

* * * * *